United States Patent
Sato

(10) Patent No.: US 7,623,811 B2
(45) Date of Patent: Nov. 24, 2009

(54) DRIVE TRANSMITTING MECHANISM AND IMAGE FORMING APPARATUS

(75) Inventor: Yoji Sato, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 262 days.

(21) Appl. No.: 11/676,572

(22) Filed: Feb. 20, 2007

(65) Prior Publication Data
US 2007/0196131 A1    Aug. 23, 2007

(30) Foreign Application Priority Data
Feb. 20, 2006   (JP)   ............... 2006-042776

(51) Int. Cl.
*G03G 15/00*   (2006.01)
(52) U.S. Cl. ...................... 399/167; 399/117
(58) Field of Classification Search ................ 399/167, 399/117; 464/104
See application file for complete search history.

(56) References Cited

U.S. PATENT DOCUMENTS

| | | | |
|---|---|---|---|
| 6,574,446 B2 | 6/2003 | Kitayama | |
| 2002/0025191 A1* | 2/2002 | Kitayama | 399/222 |
| 2002/0057928 A1* | 5/2002 | Yasumoto et al. | 399/167 |
| 2005/0111881 A1* | 5/2005 | Arimitsu et al. | 399/167 |
| 2005/0254858 A1* | 11/2005 | Numagami et al. | 399/167 |
| 2006/0093398 A1* | 5/2006 | Hayakawa | 399/111 |

FOREIGN PATENT DOCUMENTS

JP        2002-48148        2/2002

\* cited by examiner

*Primary Examiner*—David M Gray
*Assistant Examiner*—Billy J Lactaoen
(74) *Attorney, Agent, or Firm*—Turocy & Watson, LLP

(57) ABSTRACT

A drive transmitting mechanism configured to rotate the photosensitive drum of a color copier has a driving shaft, a driven shaft, and first and second coupling members. The first coupling member has a projection extending in a diametrical direction. The first coupling member is attached to the driving shaft, with amount of freedom to oscillate in a direction intersecting at right angles to the lengthwise direction of the projection. The second coupling member has a recess in which the projection is fitted. The second coupling member is attached to the driven shaft, with amount of freedom to oscillate in the lengthwise direction of the recess. The first and second coupling members oscillate in the diametrical direction and slide on the contacting surface in a diametrical direction intersecting at right angles to the diametrical direction, thus suppressing the rotational speed change of the driven shaft, which results from the de-centering and declination between the driving shaft and the driven shaft.

13 Claims, 5 Drawing Sheets

DRIVE TRANSMITTING MECHANISM AND IMAGE FORMING APPARATUS

CROSS REFERENCE TO RELATED APPLICATION

This application is based upon and claims the benefit of priority from prior Japanese Patent Application No. 2006-42776 filed on Feb. 20, 2006, the entire contents of which are incorporated herein by reference.

BACKGROUND OF THE INVENTION

1. Field of the Invention

The present invention relates to a drive transmitting mechanism in which a driving shaft and a driven shaft are arranged in a axial alignment and can be coupled and decoupled, and a rotational drive force is transmitted from the driving shaft to the driven shaft via a pair of coupling members, and to an image forming apparatus that comprises this drive transmitting mechanism.

2. Description of the Related Art

In laser printers and digital copiers, which are designed to print high-quality images, the change in the rotational speed of the photosensitive drum greatly influences the image quality. Therefore, the structure of the drive coupling unit for rotating the photosensitive drum is an important element in designing the structure of the copier.

In a color copier of so-called quadruple-tandem type, and the like, the rotational speed change of the photosensitive drum per rotation results from the de-centering and declination between the rotating shaft of the photosensitive drum and the driving shaft that rotates the drum. This rotational speed change results in color misalignment on the printed sheets.

A method of minimizing the de-centering and declination between the rotating shaft of the photosensitive drum and the driving shaft is known. In this method, the driving shaft is fitted in the drum, thus positioning the driving shaft. This method is disadvantageous, however, in that the position adjustment of the driving shaft with respect to the shaft of the drum is extremely difficult to achieve. Copiers and the like comprise many driven components. Hence, even if the driving shaft is precisely positioned with respect to the rotating shaft of the drum, it is anticipated that the vibration caused by these driven components generate the misalignment between the rotating shaft and the driving shaft as time passes, due to. Every time misalignment develops between the rotating shaft and the driving shaft, the rotating shaft and the driving shaft must be positioned again with respect to each other.

The Oldam coupling is known as a coupling mechanism that couples a driving shaft and a driven shaft so that a driving force may be transmitted from the driving shaft to the driven shaft. The Oldam coupling can indeed compensate for (absorb) the de-centering, but cannot compensate for the declination. It is therefore necessary to increase the degree of parallelism between the driving shaft and the driven shaft.

JP2002-48148 discloses a driving-force transmitting device comprising a coupling that has amount of freedom (can move) in the radial direction and thrust direction. The coupling is configured to compensate for de-centering and declination at the same time. The coupling is attached to either the driving shaft or the driven shaft.

In this driving-force transmitting device, however, only one of the shafts responds to de-centering and declination. A large load is inevitably applied to that part of the coupling to which this shaft is attached. The load is so large that the coupling may be deformed or may be broken.

For the maintenance of any image forming apparatus, the photosensitive drum is cleaned or replaced by a new one. In such case, the photosensitive drum is pulled from the housing of the image forming apparatus. After cleaned, the photosensitive drum is set back in the housing. Otherwise, a new drum is set in the housing. In this case where the coupling disclosed in JP2002-48148 may be used to rotate the photosensitive drum, the efficiency of connecting this coupling to the photosensitive drum to set the drum in the housing of the image forming apparatus is not high.

BRIEF SUMMARY OF THE INVENTION

An object of the present invention is to provide a drive transmitting mechanism with a coupling that can be coupled and decoupled from each other to connect a driving shaft with a driven shaft, and that can be compensated for the de-centering and declination within a specific range. Another object of the present invention is to provide an image forming apparatus that comprises this drive transmitting mechanism.

A drive transmitting mechanism according to the present invention comprises: a driving shaft; a driven shaft which is rotated as the driving shaft rotates; and a pair of coupling members that are attached to the driving shaft and the driven shaft, respectively, to transmit a rotational drive force from the driving shaft to the driven shaft. These members oscillate in one diametrical direction and slide at mutually contacting surfaces in another diametrical direction intersecting at right angles to the one diametrical direction. Thus, these members suppress the rotational speed change of the driven shaft, which results from the de-centering and declination between the driving shaft and the driven shaft.

In the drive transmitting mechanism, the pair of coupling members may be a first coupling member attached to the driving shaft and a second coupling member attached to the driven shaft. The first coupling member has a projection having a predetermined width and extending in the one diametrical direction and a first insertion hole in which the driving shaft is inserted. The second coupling member has a recess in which the projection is fitted, and a second insertion hole in which the driven shaft is inserted. The first coupling member is attached to the driving shaft, with amount of freedom to oscillate in a diametrical direction that intersects at right angles to a lengthwise direction of the projection. The second coupling member is attached to the driven shaft, with amount of freedom to oscillate in a diametrical direction that intersects at right angles to a lengthwise direction of the recess.

An image forming apparatus according to this invention comprises a photosensitive drum in which the drive transmitting mechanism described above is applied to rotate.

In the drive transmitting mechanism described above, the de-centering and declination between the driving shaft and the driven shaft can be compensated for (absorbed), achieving smooth transmission of rotation. This can minimize changes in the rotational speed of the driven shaft. This drive transmitting mechanism may be applied to rotate the photosensitive drums provided in a color image forming apparatus of electro-photography type. Then, the apparatus can form clear images without color shifts. The coupling members attached to the driving and driven shafts, respectively, can be easily coupled and decoupled. Therefore, if the drive transmitting mechanism is applied to rotate a photosensitive drum, it will facilitate the setting and removal of the photosensitive drum in and from the housing of the image forming apparatus.

DETAILED DESCRIPTION OF THE PREFERRED EMBODIMENTS

Embodiments of the present invention will be described in detail, with reference to the accompanying drawings. A color copier of quadruple-tandem type is a type of image forming apparatus according to this invention. The configuration of a drive transmitting mechanism according to this invention, used in the color copier to drive the photosensitive drum will be described.

Figure 1:
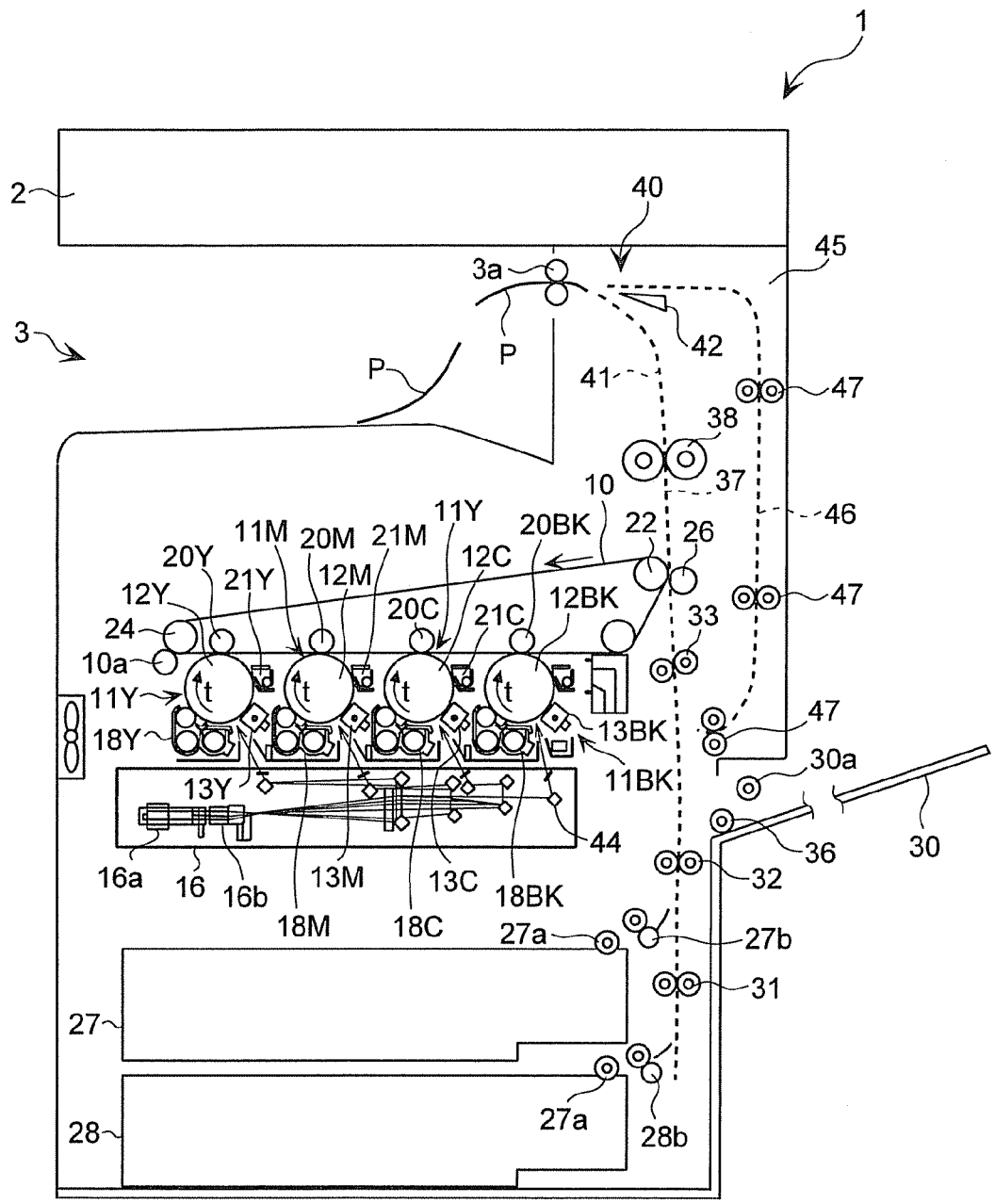
FIG. 1 is a schematic diagram showing the configuration of a color copier of quadruple-tandem type.

FIG. 1 schematically shows the configuration of this color copier 1 of quadruple-tandem type. The color copier 1 comprises a scanner unit 2 provided at the top and a sheet-ejecting unit 3 provided in the housing. The color copier 1 further comprises an intermediate transfer belt 10, a driving roller 22, driven rollers 23 and 24, and four image-forming units 11Y, 11M, 11C and 11BK. The intermediate transfer belt 10 is an intermediate transfer media. The driving roller 22 and the driven rollers 23 and 24 cooperate to stretch and drive the intermediate transfer belt 10. The image-forming units 11Y, 11M, 11C and 11BK are arranged side by side, below the intermediate transfer belt 10.

Preferably, the intermediate transfer belt 10 is made of material excelling in heat resistance and abrasion resistance, such as semiconductive polyimide. The image-forming units 11Y, 11M, 11C and 11K can form yellow (Y) toner images, magenta (M) toner images, cyan (C) toner images and black (BK) toner images, respectively. The image-forming units 11Y, 11M, 11C and 11BK have photosensitive drums 12Y, 12M, 12C and 12BK, respectively, which are image carriers. The intermediate transfer belt 10 contacts the photosensitive drums 12Y, 12M, 12C and 12BK at the upper part of the image-forming units 11C to 11BK.

Primary-transfer rollers 20Y, 20M, 20C and 20BK are provided at a position (primary-transfer position), facing the photosensitive drums 12Y, 12M, 12C and 12BK, respectively, across the intermediate transfer belt 10. Primary-transfer voltage of about +1000 V is applied to the primary-transfer rollers 20Y, 20M, 20C and 20BK. Toner image are thereby primarily transferred from the photosensitive drums 12Y, 12M, 12C and 12BK onto the intermediate transfer belt 10.

The image-forming units 11Y, 11M, 11C and 11BK have respectively chargers 13Y, 13M, 13C and 13BK, developing units 18Y, 18M, 18C and 18BK, and cleaning devices 21Y, 21M, 21C and 21BK. The chargers 13Y, 13M, 13C and 13BK apply electrical charges to the photosensitive drums 12Y, 12M, 12C and 12BK, respectively. The developing units 18Y, 18M, 18C and 18BK applies toners to the latent images formed on the photosensitive drums 12Y, 12M, 12C and 12BK respectively. The cleaning devices 21Y, 21M, 21C and 21BK are provided to clean the photosensitive drums 12Y, 12M, 12C and 12BK respectively.

The chargers 13Y, 13M, 13C and 13BK electrically charge the photosensitive drums 12Y, 12M, 12C and 12BK to about −700 V respectively, at the entire circumferential surface. The developing units 18Y, 18M, 18C and 18BK have a developing roller each, which is applied with a developing bias voltage of about −500 V. Therefore, the developing units 18Y, 18M, 18C and 18BK apply two-component developers to the photosensitive drums 12Y, 12M, 12C and 12BK, respectively. Each developer consists of color toner (yellow (Y) toner, magenta (M) toner, cyan (C) toner, or black (BK) toner) and carrier. The cleaning devices 21Y, 21M, 21C and 21BK remove residual toner from the circumferential surfaces of the photosensitive drums 12Y, 12M, 12C and 12BK.

The image-forming units 11Y, 11M, 11C and 11BK can be drawn out from the front of the housing of the color copier 1 (i.e., forward and perpendicular to the drawing). The drive devices for driving the photosensitive drums 12Y, 12M, 12C and 12BK and the drive devices for driving the developing units 18Y, 18M, 18C and 18BK are arranged in the rear side of the housing of the color copier 1.

The photosensitive drums 12Y, 12M, 12C and 12BK are rotated in the direction of arrow t. Any part of the circumferential surface of each drum is exposed to light as it moves from the charger 13Y, 13M, 13C or 13BK to the developing unit 18Y, 18M, 18C or 18BK. The light is applied from a laser exposure device 16 that forms latent images on the photosensitive drums 12Y, 12M, 12C and 12BK in accordance with the image data supplied from the scanner unit 2. The laser exposure device 16 is arranged below the image-forming units 11Y, 11M, 11C and 11BK.

The laser exposure device 16 has semiconductor laser elements, a polygon mirror 16a, a focusing lens system 16b, and mirrors 44. The polygon mirror 16a scans the laser beam emitted from the semiconductor laser elements in the axial direction of the photosensitive drums 12Y, 12M, 12C and 12BK. Thus, the laser beam is focused on the photosensitive drums 12Y, 12M, 12C and 12BK, after passing through the focusing lens system 16b and reflected by the mirrors 44. Cover glasses are provided at those parts of the laser exposure device 16, from which laser beams for different colors are emitted.

In the color copier 1, a secondary-transfer roller 26 is arranged at the position facing the driving roller 22 for driving the intermediate transfer belt 10, across the intermediate transfer belt 10. The secondary-transfer roller 26 serves to transfer the toner image from the intermediate transfer belt 10 onto a printing sheet P (thus, accomplishing secondary transfer). Secondary-transfer voltage of about +1000 V is applied to the secondary-transfer roller 26. The toner image is thereby transferred from the intermediate transfer belt 10 onto the printing sheet P. A belt cleaner 10a is provided at downstream of the secondary-transfer roller 26 along the intermediate transfer belt 10.

First and second sheet cassettes 27 and 28 are provided below the laser exposure device 16. Printing sheets can be supplied from these cassettes 27 and 28 to the secondary-transfer roller 26. In the path extending from the sheet cassettes 27 and 28 to the secondary-transfer roller 26, there are provided pickup rollers 27a and 28a, separating rollers 27b and 28b, first feeding rollers 31, second feeding rollers 32, and register rollers 33. The pickup rollers 27a and 28a takes printing sheets P from the first and second sheet cassettes 27 and 28.

A manual-feed tray 30 is provided on the right side (FIG. 1) of the color copier 1. In the path extending from the hand-feed tray 30 to the register rollers 33, a pickup roller 30a and a hand-feed roller 36 are arranged. The pickup roller 30a is used to take out a printing sheet P.

A vertical feed path 37 is provided, in which printing sheets P are transported from the first and second sheet cassettes 27 and 28 and from the manual-feed tray 30. A fixing device 38 is located downstream of the secondary-transfer roller 26 (that is, above the secondary-transfer roller 26) along the vertical feed path 37. The fixing device 38 is designed to fix the toner image on a printing sheet P by heat treatment.

A sheet-ejecting path 41 extends from the fixing device 38 to the sheet-ejecting unit 3. At the terminal end of the sheet-ejecting path 41, sheet-ejecting rollers 3a are provided. The color copier 1 has a reversing area 40 and a reverse-feed unit 45 on the right side (FIG. 1) of the sheet-ejecting unit 3. In the reversing area 40, a printing sheet P is printed at both sides. The reverse-feed unit 45 is configured to move printing sheets P back to the register roller 33.

The sheet-ejecting rollers 3a can rotate in a direction (forward direction) to feed printing sheets P to the sheet-ejecting unit 3 and in the opposite direction (reverse direction) to move printing sheets P back to the reverse-feed unit 45. In the reversing area 40 there is provided a guide 42. The guide 42 guides a printing sheet P onto the guide 42 when the sheet-ejecting rollers 3a rotates to feed the printing sheet P back to the reverse-feed unit 45. The printing sheet P is thereby reliably fed to the reverse-feed unit 45. The reverse-feed unit 45 has a reverse-feed path 46 and re-feed rollers 47 to 47 feed a printing sheet P downwards.

The mechanism for rotating the photosensitive drums 12Y, 12M, 12C and 12BK will be described. Since the photosensitive drums 12Y, 12M, 12C and 12BK have the same structure, how the photosensitive drum 12Y is rotated will be explained.

As specified above, the image-forming unit 11Y can be drawn out from the front of the housing of the collie copier 1. The drive device (motor) for driving the photosensitive drum 12Y is arranged at the rear of the housing of the color copier 1. Hence, the rotating shaft of the photosensitive drum 12Y (hereinafter referred to as "driven shaft") and the rotating shaft of the drive device (hereinafter referred to as "driving shaft") can coupled with each other and decoupled from each other. A coupling member is attached to the end of the driving shaft, another coupling member to the end of the driven shaft. Thus, the rotation of the driving shaft can be transmitted to the driven shaft after the photosensitive drum 12Y has been set in the housing of the cooler copier 1.

Figure 2:
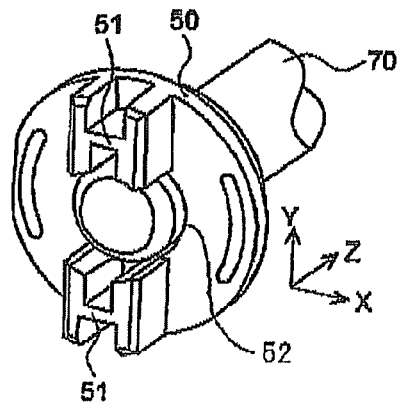
FIG. 2 is a perspective view of the first coupling member attached to the end of the driving shaft.
Figure 3:
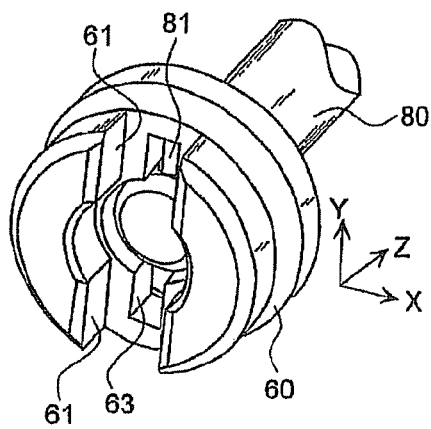
FIG. 3 is a perspective view of the second coupling member attached to the end of the driven shaft.
Figure 4:
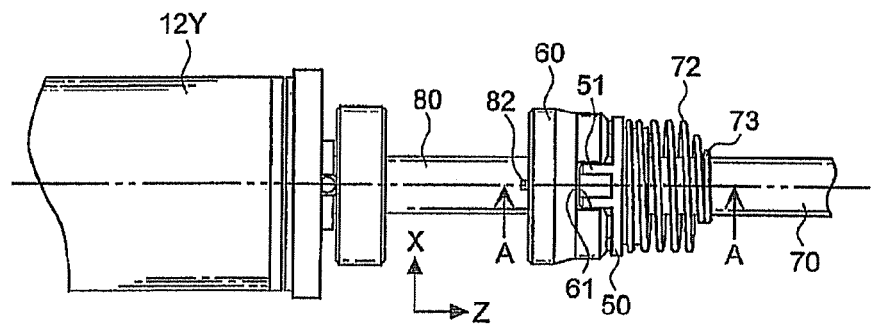
FIG. 4 is a side view showing the first and second coupling members fitted together.
Figure 5:
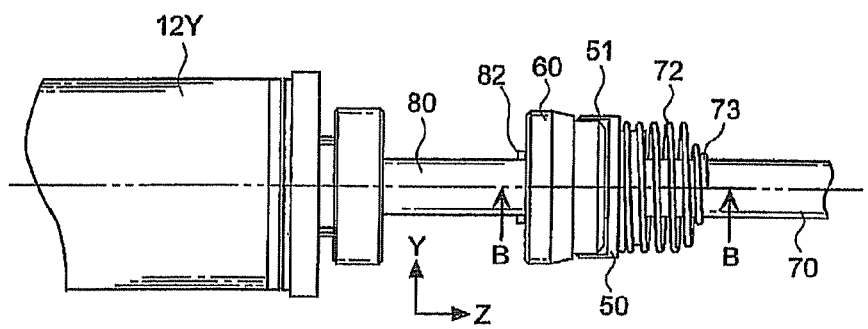
FIG. 5 is another side view showing the first and second coupling members fitted together.
Figure 6:
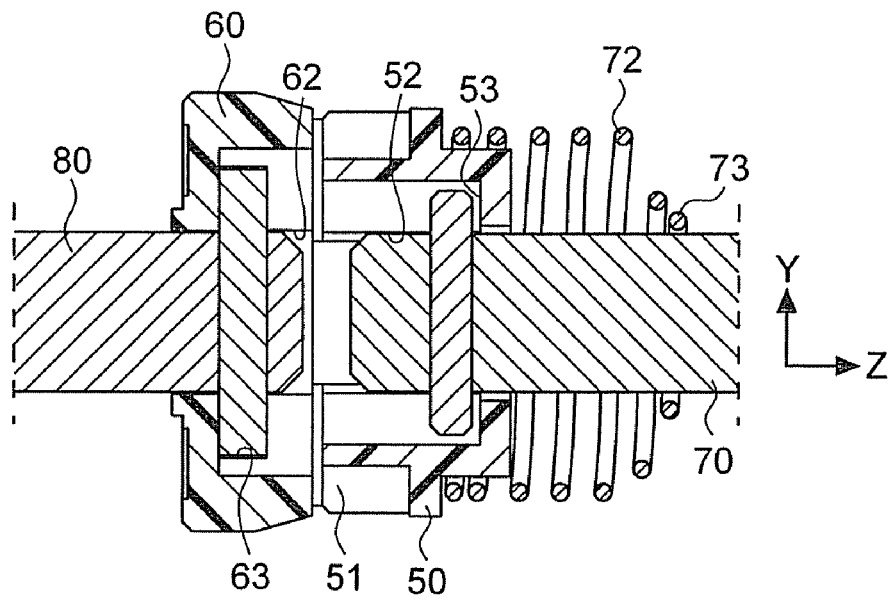
FIG. 6 is a sectional view taken along line A-A shown in FIG. 4.
Figure 7:
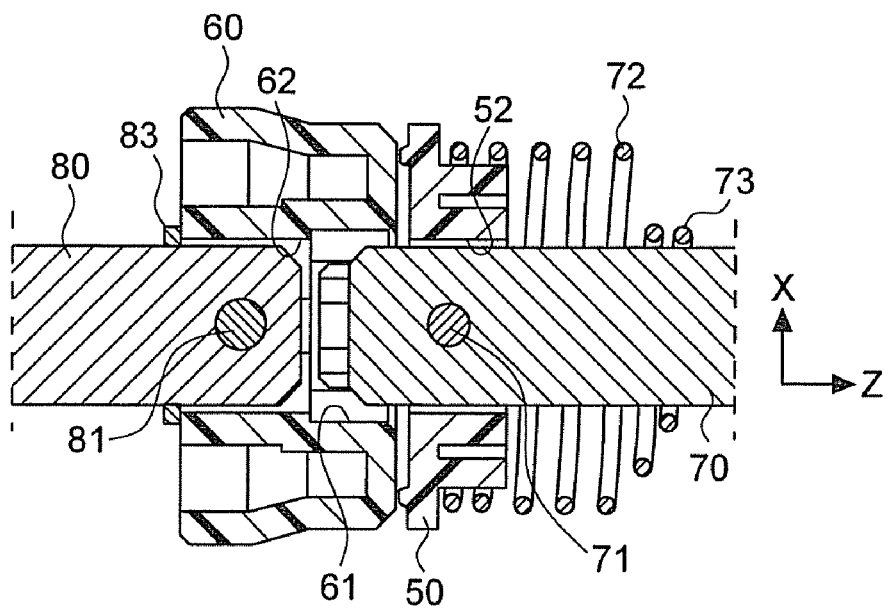
FIG. 7 is a sectional view taken along line B-B shown in FIG. 5.

FIG. 2 is a perspective view of the first coupling member attached to the end of the driving shaft. FIG. 3 is a perspective view of the second coupling member attached to the end of the driven shaft. FIG. 4 is a side view showing the first and second coupling members fitted together. FIG. 5 is another side view showing the first and second coupling members fitted together. FIG. 6 is a sectional view taken along line A-A shown in FIG. 4. FIG. 7 is a sectional view taken along line B-B shown in FIG. 5.

The first coupling member 50 has a projection 51 and a first insertion hole 52. The projection 51 extends in the diameter direction (Y direction) and has a predetermined width (measured in the X direction). The first insertion hole 52 is used for insertion of the end of the driving shaft 70. The shape of the projection 51 has an H-shaped pattern, as viewed from the front. The shape of the projection 51 is not limited to this, nonetheless. The shape of the projection 51 may be a rectangular. As FIG. 2 shows, the projection 51 is divided into two parts, because the first insertion hole 52 is a through hole. Nevertheless, the projection 51 can be said to be arranged in the Y direction that is a diametrical direction.

The driving shaft 70 has a first parallel pin 71, a compression spring 72, and a first holding part 73. The first parallel pin 71 is arranged to the end of the driving shaft 70 and extends perpendicular to the axial direction (Z direction) of the driving shaft 70. The compression spring 72 biases the first coupling member 50 toward the end thereof. The first holding part 73 holds the compression spring 72.

The first coupling member 50 has a first pin receptacle 53 which is a recess to hold the first parallel pin 71, so as to fit to the end-shape of the driving shaft 70. The first pin receptacle 53 extends parallel to the lengthwise direction (Y direction) of the projection 51.

The compression spring 72 pushes the first coupling member 50 toward the distal end of the driving shaft 70. The first parallel pin 71 is thereby set in the first pin receptacle 53. When the driving shaft 70 is rotated by the motor (not shown), the first parallel pin 71 is held in contact with the wall of the first pin receptacle 53. A rotational drive force is therefore transmitted from the driving shaft 70 to the first coupling member 50. The first coupling member 50 is thereby rotated as the driving shaft 70 rotates.

Figure 8:
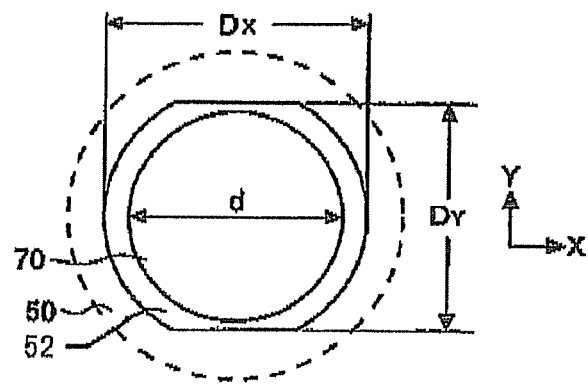
FIG. 8 is a diagram representing the relation between the outer diameter of the driving shaft and the shape of the first insertion hole.

FIG. 8 represents the relation between the outer diameter of the driving shaft 70 and the shape of the first insertion hole 52. The driving shaft 70 is shaped as a round bar. The driving shaft 70 has an outer diameter d that can be regarded as practically uniform. The first insertion hole 52 is so shaped that it gives the projection 51 no amount of freedom to oscillate in the Y direction. In other words, the first insertion hole 52 is so shaped that the first coupling member 50 would not rotate in the Y direction with respect to the driving shaft 70. The diameter DY of the first insertion hole 52 has in the Y direction should preferably be about d+0.1 mm, falling within a tolerance, thus allowing the driving shaft 70 to pass through the first insertion hole 52.

Further, the first insertion hole 52 is shaped, having amount of freedom in the X direction, i.e., diametrical direction which intersects at right angles with the lengthwise direction of the projection 51. In other words, the first insertion hole 52 is so shaped that the first coupling member 50 may oscillate in the X direction with respect to the driving shaft 70.

Therefore, a predetermined gap is provided, in the X direction, between the outer circumferential surface of the driving shaft 70 and the wall of the first insertion hole 52. The first coupling member 50 rotates around the first parallel pin 71, which acts as a rotation axis. Assume that the first insertion hole 52 has, for example, a diameter DX of d1+Δ (DX=d1+Δ) in the X direction. Note that the value Δ is determined in consideration if the angle of oscillation required. To allow de-centering of, for example, 0.2 mm, Δ can be greater than this de-centering, for example, 0.25 to 0.3 mm.

Thus, the first coupling member 50 is attached to the driving shaft 70, with no amount of freedom to oscillate in the Y direction, i.e., the lengthwise direction of the projection 51, and with a prescribed amount of freedom to oscillate in the X direction.

The second coupling member 60 has a recess 61 and a second insertion hole 62. The recess 61 can fit into the projection 51. A driven shaft 80 is inserted in the second insertion hole 62. To fit into the projection 51, the recess 61 is a groove that extends in the Y direction. The difference in width between the projection 51 and the recess 61 has such a value that the projection 51 may slide in the X direction but as little as possible. This width difference should preferably fall within a tolerance to the manufacturing process of the first and second coupling members 50 and 60, for example ranging from 0.05 mm to 0.2 mm. The second insertion hole 62 can be a through hole like the first insertion hole 52.

The first and second coupling members 50 and 60 can slide each other in the Y direction in the same way as an Oldam coupling does, under the state that the projection 51 is fitting into the recess 61. The de-centering and declination can be thereby absorbed. To make the projection 51 easily sliding on the bottom of the recess 61, the first and second coupling members 50 and 60 may be made of, preferably, material having a small coefficient of friction, such as polyacetal resin, fluorocarbon resin or the like.

The driven shaft 80 has a second parallel pin 81 and a second holding part 82. The second parallel pin 81 is arranged to the end of the driven shaft 80 and extends perpendicular to the axial direction (Z direction) of the driven shaft 80. The second holding part 82 is also arranged near the end of the driven shaft 80 and holds the second coupling member 60. The second parallel pin 81 extends in the Y direction.

The second holding part 82 prevents the second coupling member 60 from being pushed toward the photosensitive drum 12Y. When the photosensitive drum 12Y is set into the housing of the color copier 1, the compression spring 72 applies a load on the first coupling member 50 in thrust direction. Therefore, the projection 51 may not be fitted into the recess 61. In such a case, the upper surface of the recess 61 prepared in the second coupling member 60 may contact the upper surface of the projection 51 prepared in the first coupling member 50. The first coupling member 50 may move in the Z direction (toward the motor, not shown) as it is pushed by the second coupling member 60. If this happens, the driving shaft 70 or the driven shaft 80 may be rotated by a prescribed angle. Then, the projection 51 can be fitted into the recess 61. Thus, the photosensitive drum 12Y can be easily attached to and removed from the housing of image forming apparatus 1 by using the first and second coupling members 50 and 60.

To conform in shape with the end of the driven shaft 80, the second coupling member 60 has a second pin receptacle 63 which extends parallel to the lengthwise direction (Y direction) of the recess 61, and which is a recess to hold the second parallel pin 81. The driving shaft 70 is rotated, with the projection 51 of the first coupling member 50 fitted in the recess 61 of the second coupling 60. The rotation of the first coupling member 50 is transmitted to the second coupling member 60. As the second coupling member 60 rotates, the second parallel pin 81 is rotated because it contacts the wall of the second pin receptacle 63, whereby the driven shaft 80 is rotated. The photosensitive drum 12Y is thereby rotated.

Like the first coupling member 50, the second coupling member 60 is attached to the driven shaft 80, with no amount of freedom to oscillate in the Y direction, i.e., the lengthwise direction of the recess 61, and with a prescribed amount of freedom to oscillate in the X direction. Therefore, the second insertion hole 62 is designed in the same way as the first insertion hole 52. The second coupling member 60 oscillates around the second parallel pin 81.

When the drive force is transmitted from the driving shaft 70 to the driven shaft 80, with the first coupling member 50 fitted in the second coupling member 60 as described above, de-centering and declination may occur between the driving shaft 70 and driven shaft 80 coupled together. Nonetheless, the de-centering and declination can be absorbed, because the first and second coupling members 50 and 60 oscillate in the X direction and slide on each other in the Y direction. This can suppress the possible changes in the rotational speed of the driven shaft 80.

Figure 9:
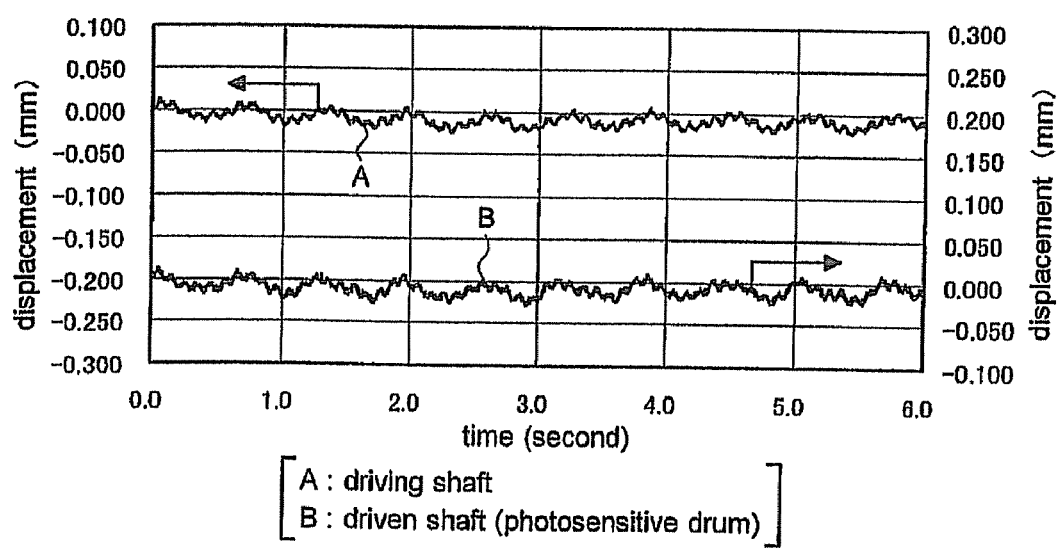
FIG. 9 is a graph showing how the rotational speeds of the driving shaft and driven shaft change in case of the drive transmitting mechanism, in terms of the displacement of the image formed on a printing sheet.
Figure 10:
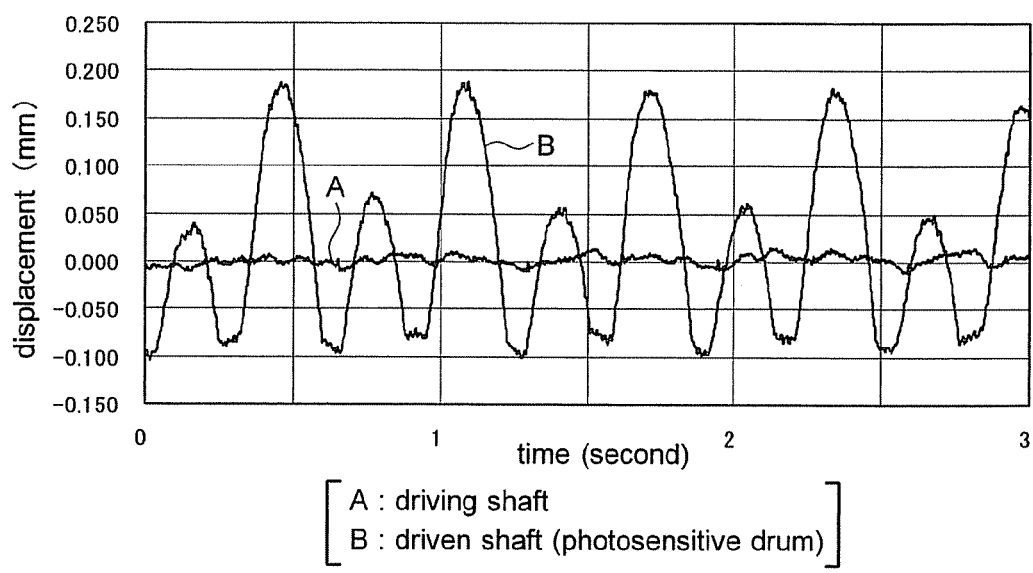
FIG. 10 is a graph showing how the rotational speeds of the driving shaft and driven shaft change in case of the conventional apparatus, in terms of the displacement of the image formed on a printing sheet.

The driving shaft 70 and the driven shaft 80, both having a diameter d of φ8 mm, were coupled to each other, de-centered by 0.25 mm to each other, by using the first and second coupling members 50 and 60 that have DX of φ8.3 mm and DY of 48.1 mm. The rotational speed of the driving shaft 70 and that of the driven shaft 80 were measured at the same time by using encoders. The rotational speeds thus measured were converted to the displacement of the image formed on a printing sheet. FIG. 9 shows how the displacement changed. FIG. 10 shows how the displacement changed when an Oldam coupling is used to couple a driving shaft and a driven shaft, inevitably causing the shafts to slide in one direction.

As seen from FIG. 10, the rotational speed of the driven shaft 80 greatly changed every time the driven shaft 80 rotated through 360° when the Oldam coupling is used. Thus, the Oldam coupling could not absorb the de-centering of the driven shaft. By contrast, as illustrated in FIG. 9, the drive force was transmitted from the driving shaft 70 to the driven shaft 80 without changing the rotational speed of the driven shaft 80, by using the first and second coupling members 50 and 60 according to this invention, even if the driven shaft 80 is de-centered with respect to the driving shaft 70.

The present invention is not limited to the embodiments described above. It goes without saying that various obvious modifications and simple variants come within the scope of the present invention as described in the claims appended hereto and are included in the present invention.

What is claimed is:

1. A drive transmitting mechanism comprising:
   a driving shaft;
   a driven shaft which is rotated as the driving shaft rotates; and
   a pair of coupling members which are attached to the driving shaft and the driven shaft, respectively, to transmit a rotational drive force from the driving shaft to the driven shaft, which causes a oscillation in one diametrical direction and a sliding at a contacting surface in another diametrical direction intersecting at right angles to the one diametrical direction, and one of which has two H-shaped projections.

2. The drive transmitting mechanism according to claim 1, wherein the pair of coupling members are a first coupling member attached to the driving shaft and a second coupling member attached to the driven shaft; the first coupling member has a projection having a predetermined width and extending in the one diametrical direction and a first insertion hole in which the driving shaft is inserted, and is attached to the driving shaft with amount of freedom to oscillate in a diametrical direction that intersects at right angles to a lengthwise direction of the projection; and the second coupling member has a recess in which the projection is fitted, and a second insertion hole in which the driven shaft is inserted, and is attached to the driven shaft with amount of freedom to oscillate in a diametrical direction that intersects at right angles to a lengthwise direction of the recess.

3. The drive transmitting mechanism according to claim 2, wherein a predetermined gap is provided between an outer circumference of the driving shaft and a wall of the first insertion hole and extends in the diametrical direction intersecting at right angles with the lengthwise direction of the projection; and a predetermined gap is provided between an outer circumference of the driven shaft and a wall of the second insertion hole and extends in the diametrical direction intersecting at right angles with the lengthwise direction of the recess.

4. The drive transmitting mechanism according to claim 2, wherein the first coupling member is attached to the driving shaft, with no amount of freedom to oscillate in the longwise direction of the projection; and the second coupling member is attached to the driven shaft, with no amount of freedom to oscillate in the longwise direction of the recess.

5. The drive transmitting mechanism according to claim 2, wherein the driving shaft comprises a first parallel pin provided at a end and extending perpendicular to an axial direction, a compression spring biasing the first coupling member toward the distal end, and a first holding part holding the first compressing spring; and the first coupling member has a first pint receptacle for receiving the first parallel pin and positioning the same parallel to the lengthwise direction of the projection.

6. The drive transmitting mechanism according to claim 2, wherein the driven shaft comprises a second parallel pin provided at a end and extending perpendicular to an axial direction and a second holding part holding the second coupling member; and the second coupling member has a second pint receptacle for receiving the second parallel pin and positioning the same parallel to the lengthwise direction of the recess.

7. An image forming apparatus comprising:
a drive transmitting mechanism having a driving shaft, a driven shaft which is rotated as the driving shaft rotates, and a pair of coupling members which are attached to the driving shaft and the driven shaft, respectively, to transmit a rotational drive force from the driving shaft to the driven shaft, and which causes a oscillation in one diametrical direction and a sliding at a contacting surface in another diametrical direction intersecting at right angles to the one diametrical direction, and one of which has two H-shaped projections;
a photosensitive drum unit which rotates around the driven shaft; and
a motor unit which rotates the driving shaft.

8. The image forming apparatus according to claim 7, wherein the pair of coupling members are a first coupling member attached to the driving shaft and a second coupling member attached to the driven shaft; the first coupling member has a projection having a predetermined width and extending in the one diametrical direction and a first insertion hole in which the driving shaft is inserted, and is attached to the driving shaft, with amount of freedom to oscillate in a diametrical direction that intersects at right angles to a lengthwise direction of the projection; and the second coupling member has a recess in which the projection is fitted, and a second insertion hole in which the driven shaft is inserted, and is attached to the driven shaft, with amount of freedom to oscillate in a diametrical direction that intersects at right angles to a lengthwise direction of the recess.

9. The image forming apparatus according to claim 8, wherein a predetermined gap is provided between an outer circumference of the driving shaft and a wall of the first insertion hole and extends in the diametrical direction intersecting at right angles with the lengthwise direction of the projection; and a predetermined gap is provided between an outer circumference of the driven shaft and a wall of the second insertion hole and extends in the diametrical direction intersecting at right angles with the lengthwise direction of the recess.

10. The image forming apparatus according to claim 8, wherein the first coupling member is attached to the driving shaft, with no amount of freedom to oscillate in the longwise direction of the projection; and the second coupling member is attached to the driven shaft, with no amount of freedom to oscillate in the longwise direction of the recess.

11. The image forming apparatus according to claim 8, wherein the driving shaft comprises a first parallel pin provided at a end and extending perpendicular to an axial direction, a compression spring biasing the first coupling member toward the distal end, and a first holding part holding the first compressing spring; and the first coupling member has a first pint receptacle for receiving the first parallel pin and positioning the same parallel to the lengthwise direction of the projection.

12. The image forming apparatus according to claim 8, wherein the driven shaft comprises a second parallel pin provided at a end and extending perpendicular to an axial direction and a second holding part holding the second coupling member; and the second coupling member has a second pint receptacle for receiving the second parallel pin and positioning the same parallel to the lengthwise direction of the recess.

13. The image forming apparatus according to claim 8, wherein the photosensitive drum unit comprises four photosensitive drums for forming a yellow toner image, a magenta toner image, a cyan toner image and a black toner image, respectively, four coupling members identical to the second coupling member are attached to rotating shafts of the photosensitive drums, respectively, and the motor unit comprises four motors provided for the four coupling members, respectively.

* * * * *